US011724677B2

(12) United States Patent
Han et al.

(10) Patent No.: US 11,724,677 B2
(45) Date of Patent: Aug. 15, 2023

(54) SUPPLEMENTAL BRAKING CONTROL SYSTEM IN AUTONOMOUS VEHICLES

(71) Applicant: TUSIMPLE, INC., San Diego, CA (US)

(72) Inventors: Xiaoling Han, San Diego, CA (US); Kun Zhang, San Diego, CA (US); Yu-Ju Hsu, Tucson, AZ (US); Frederic Rocha, San Diego, CA (US); Zehua Huang, San Diego, CA (US); Charles A. Price, San Diego, CA (US)

(73) Assignee: TUSIMPLE, INC., San Diego, CA (US)

(*) Notice: Subject to any disclaimer, the term of this patent is extended or adjusted under 35 U.S.C. 154(b) by 379 days.

(21) Appl. No.: 17/019,161

(22) Filed: Sep. 11, 2020

(65) Prior Publication Data

US 2021/0078550 A1 Mar. 18, 2021

Related U.S. Application Data

(60) Provisional application No. 62/900,430, filed on Sep. 13, 2019.

(51) Int. Cl.
*B60T 7/00* (2006.01)
*B60T 8/171* (2006.01)
*B60T 8/88* (2006.01)
*B60T 8/17* (2006.01)

(52) U.S. Cl.
CPC ............ *B60T 8/171* (2013.01); *B60T 8/1708* (2013.01); *B60T 8/885* (2013.01); *B60T 2250/04* (2013.01); *B60T 2270/402* (2013.01)

(58) Field of Classification Search
CPC ........ B60T 8/171; B60T 8/1708; B60T 8/885; B60T 2250/04; B60T 2270/402; B60T 7/00; B60W 30/18109; B60W 60/001
USPC .......................................................... 701/70
See application file for complete search history.

(56) References Cited

U.S. PATENT DOCUMENTS

| | | | | |
|---|---|---|---|---|
| 6,460,940 B1* | 10/2002 | Snmith | ................. | B60T 17/223 303/2 |
| 2002/0108817 A1* | 8/2002 | Sieber | ..................... | F16D 55/28 188/72.1 |
| 2008/0009996 A1* | 1/2008 | Saito | ........................ | B60T 8/00 701/70 |
| 2010/0094520 A1* | 4/2010 | Zagorski | ................ | G08G 1/165 340/436 |
| 2014/0191078 A1* | 7/2014 | Boren | ..................... | B64C 25/68 244/11 OH |
| 2016/0009293 A1* | 1/2016 | Biderman | ............ | G05D 1/0285 701/22 |
| 2017/0363430 A1* | 12/2017 | Al-Dahle | ............... | G01C 21/32 |
| 2018/0148019 A1* | 5/2018 | Graham | .................. | B60T 7/107 |

(Continued)

*Primary Examiner* — Shardul D Patel
(74) *Attorney, Agent, or Firm* — Paul Liu; Glenn Theodore Mathews; Perkins Coie, LLP

(57) ABSTRACT

Described are devices, systems and methods for managing a supplemental brake control system in autonomous vehicles. In some aspects, a supplemental brake management system includes brake control hardware and software that operates with a sensing mechanism for determining the brake operational status and a control mechanism for activating the supplemental brake control in an autonomous vehicle, which can be implemented in addition to the vehicle's primary brake control system.

18 Claims, 3 Drawing Sheets

(56) References Cited

U.S. PATENT DOCUMENTS

2019/0016314 A1\* 1/2019 Sanders ................ B60T 13/662
2020/0047737 A1\* 2/2020 Balogh ................... B60T 8/175

\* cited by examiner

300

310

Provide a manufactured vehicle operable for autonomous driving, in which the manufactured vehicle includes a vehicle control unit (VCU)

320

Augment the manufactured vehicle with a supplemental braking system that interfaces to a primary braking system (brakes) at one or more of the wheels of the autonomous vehicle

330

Configure a supplemental braking management unit in the manufactured vehicle that is in communication with the VCU for (i) monitoring braking of the primary baking subsystem and (ii) independently regulating braking of the supplemental braking system

FIG. 3

SUPPLEMENTAL BRAKING CONTROL SYSTEM IN AUTONOMOUS VEHICLES

PRIORITY CLAIM

This patent document claims priority to the provisional application with Ser. No. 62/900,430, titled "Supplemental Braking Control System in Autonomous Vehicles," filed on Sep. 13, 2019. The entire contents of the above noted provisional application are hereby incorporated by reference as part of the disclosure of this document.

TECHNICAL FIELD

This patent document relates to braking control of autonomous vehicles.

BACKGROUND

Autonomous or "self-driving" vehicles are vehicles capable of sensing their environment and moving without a human driver in control. Autonomous vehicles use navigation technology for sensing the position and movement of a vehicle and, based on the sensing, autonomously controlling the vehicle to navigate towards a destination. Autonomous vehicle navigation may be used in transportation of people, goods and services.

SUMMARY OF CERTAIN EMBODIMENTS

The techniques disclosed herein can be implemented in various embodiments to achieve a supplemental braking control system in autonomous vehicles, as well as methods of producing and managing supplemental braking control system.

One aspect of the disclosed embodiments relates to a system for managing braking in an autonomous vehicle that includes a vehicle control unit comprising a processor and a memory of the vehicle control unit. The vehicle control unit is configured to provide control signals to subsystems of the autonomous vehicle including a steering subsystem, a throttle subsystem and a primary braking subsystem including primary brakes coupled to at least one wheel of the autonomous vehicle. The vehicle control unit is also configured to provide control signals to autonomous control modules that are configured to control autonomous driving functionalities of the autonomous vehicle. The autonomous control modules include a steering control module, a throttle control module and a primary braking control module, wherein the primary braking control module is in communication with the primary braking subsystem. The system for managing braking in an autonomous vehicle further includes a supplemental braking subsystem including supplemental brakes at one or more wheels of the autonomous vehicle. The system for managing braking in an autonomous vehicle also includes a supplemental braking management unit configured to monitor braking of the primary braking subsystem and regulate braking of the supplemental braking subsystem.

Another aspect of the disclosed embodiments relates to a method of managing braking in an autonomous vehicle that includes monitoring braking of a primary braking subsystem and regulating braking of a supplemental braking subsystem. The primary braking subsystem includes primary brakes coupled to at least one wheel of the autonomous vehicle, and the supplemental braking subsystem includes supplemental brakes at one or more wheels of the autonomous vehicle.

Yet another aspect of the disclosed embodiments relates to a method of producing a supplementary braking system for an autonomous vehicle. The method includes providing a manufactured vehicle operable for autonomous driving. The manufactured vehicle includes a vehicle control unit comprising a processor and a memory of the vehicle control unit. The vehicle control unit is configured to provide control signals to subsystems of the manufactured vehicle including a steering subsystem, a throttle subsystem and a primary braking system including primary brakes coupled to at least one wheel of the manufactured vehicle. The vehicle control unit is also configured to provide control signals to autonomous control modules configured to control autonomous driving functionalities of the manufactured vehicle. The autonomous control modules include a steering control module, a throttle control module and a primary braking control module, wherein the primary braking control module is configured to control the primary braking system. The method further includes augmenting the manufactured vehicle with a supplemental braking system including supplemental brakes at one or more wheels of the manufactured vehicle. The method also includes providing a supplemental braking management unit in the manufactured vehicle that is in communication with the vehicle control unit for monitoring braking in the primary braking system and regulating braking in the supplemental braking system.

In some aspects of the disclosed technology, a supplemental brake management system includes brake control hardware and software that operates with a sensing mechanism for determining the brake operational status and a control mechanism for activating the supplemental brake control in an autonomous vehicle, which can be implemented in addition to the vehicle's primary brake control system.

A system of managing braking in an autonomous vehicle as described herein comprises a vehicle control unit, a supplemental braking subsystem, and a supplemental braking management unit. The vehicle control unit includes a processor and a memory. The vehicle control until is configured to provide control signals to the subsystems of the autonomous vehicle and autonomous control modules. The subsystems of the autonomous vehicle include a steering subsystem, a throttle subsystem, and a primary braking subsystem including primary brakes coupled to at least one wheel of the autonomous vehicle. The autonomous control modules are configured to control autonomous driving functionalities of the autonomous vehicle, including a steering module, a throttle control module, and a primary braking control module. The primary braking control modules is in communication with the primary braking subsystem. The supplemental braking subsystem includes supplemental brakes at one or more wheels of the autonomous vehicle. The supplemental braking management unit is configured to monitor braking of the primary braking subsystem and regulate braking of the supplemental braking subsystem.

The following features may be present in the system in any reasonable combination. The supplemental braking management until may include a processor and a memory of the supplemental braking management unit. The supplemental braking management unit may be configured to regulate braking of the supplemental braking subsystem independently from braking of the primary braking subsystem. The memory of the vehicle control unit may store instructions that cause the processor of the vehicle control unit to implement the supplemental braking management until configured to monitor braking of the primary braking subsystem and regulate braking of the supplemental braking system, in which the instructions are executed by the processor of the vehicle control unit. The supplemental brakes may include anti-lock type brakes. The supplemental braking management unit may be configured to detect when additional braking is needed to slow, stop, or both slow and then stop, the autonomous vehicle. The supplemental braking management unit may be configured to detect a malfunction or a failure of the primary braking control module and to determine whether to actuate at least some of the supplemental brakes. The supplemental braking management until is configured to monitor speed, deceleration, or both speed and deceleration of the autonomous vehicle due to braking of the brakes actuated by the primary braking control module and to determine whether to actuate the supplemental brakes at some or all of the wheels of the autonomous vehicle. The supplemental braking management unit may be configured to monitor one or more control parameters generated by the primary braking control module and to determine whether to actuate the supplemental brakes at some or all of the wheels of the autonomous vehicle. The supplemental braking management unit may be configured to monitor control of the braking power distributed to the primary brakes by the primary braking subsystem, as well as to determine whether to actuate at least some of the supplemental brakes.

A method of managing braking in an autonomous vehicle as described in some embodiments herein includes monitoring braking of a primary braking subsystem and regulating braking of a supplemental braking subsystem. The primary braking subsystem includes primary brakes coupled to at least one wheel of the autonomous vehicle, and the supplemental braking subsystem includes supplemental brakes at one or more wheels of the autonomous vehicle.

The following features may be present in the method of managing braking in an autonomous vehicle in any reasonable combination. Regulating braking of the supplemental braking subsystem may be performed independently from regulating braking of the primary braking subsystem. The method may include detecting a malfunction or a failure in the primary braking subsystem and determining whether to actuate at least some of the supplemental brakes. Monitoring speed, deceleration, or both speed and deceleration of the autonomous vehicle due to braking of the primary brakes may be part of the method. In such a method, monitoring the speed and/or deceleration of the autonomous vehicle due to braking may be accompanied by determining whether to actuate at least some of the supplemental brakes. The method may also include monitoring one or more control parameters generated in the primary braking subsystem; this monitoring may be accompanied by determining whether to actuate the supplemental brakes at some or all of the wheels of the autonomous vehicle. The method may include monitoring braking power distributed to the primary brakes by the primary braking subsystem, along with determining whether to actuate the supplemental brakes at some or all wheels of the autonomous vehicle.

A method of producing a supplementary braking system for an autonomous vehicle as described herein includes providing a manufactured vehicle operable for autonomous driving, augmenting the manufactured vehicle with a supplemental braking system, and providing a supplemental braking management unit. The manufactured vehicle includes a vehicle control unit that includes a processor and a memory. The vehicle control unit is configured to provide control signals to subsystems of the manufactured vehicle. The subsystems of the manufactured vehicle include a steering subsystem a throttle subsystem, and a primary braking system. The primary braking system includes primary brakes coupled to at least one wheel of the manufactured vehicle. The vehicle control unit is also configured to provide signals to autonomous control modules configured to control autonomous driving functionalities of the manufactured vehicle. The autonomous control modules include a steering control module, a throttle control module, and a primary braking control module. The primary braking control module is configured to control the primary braking system. The manufactured vehicle with a supplemental braking system includes supplemental brakes at one or more wheels of the manufactured vehicle. The supplemental braking management unit in the manufactured vehicle is in communication with the vehicle control unit so that it monitors braking in the primary braking system and regulates braking in the supplemental braking system.

The following features may be present in the method for producing a supplementary braking system for an autonomous vehicle in any reasonable combination. Components of the supplemental braking system may be added to the primary brakes on the one or more wheels of the manufactured vehicle. Hardware, software, or both hardware and software of the supplemental braking management unit may be installed.

The subject matter described in this patent document can be implemented in specific ways that provide one or more of the following features.

BRIEF DESCRIPTION OF THE DRAWINGS

FIG. 3 shows a diagram of an example embodiment of a method for producing a supplementary braking system for an autonomous vehicle.

DETAILED DESCRIPTION

Figure 1:
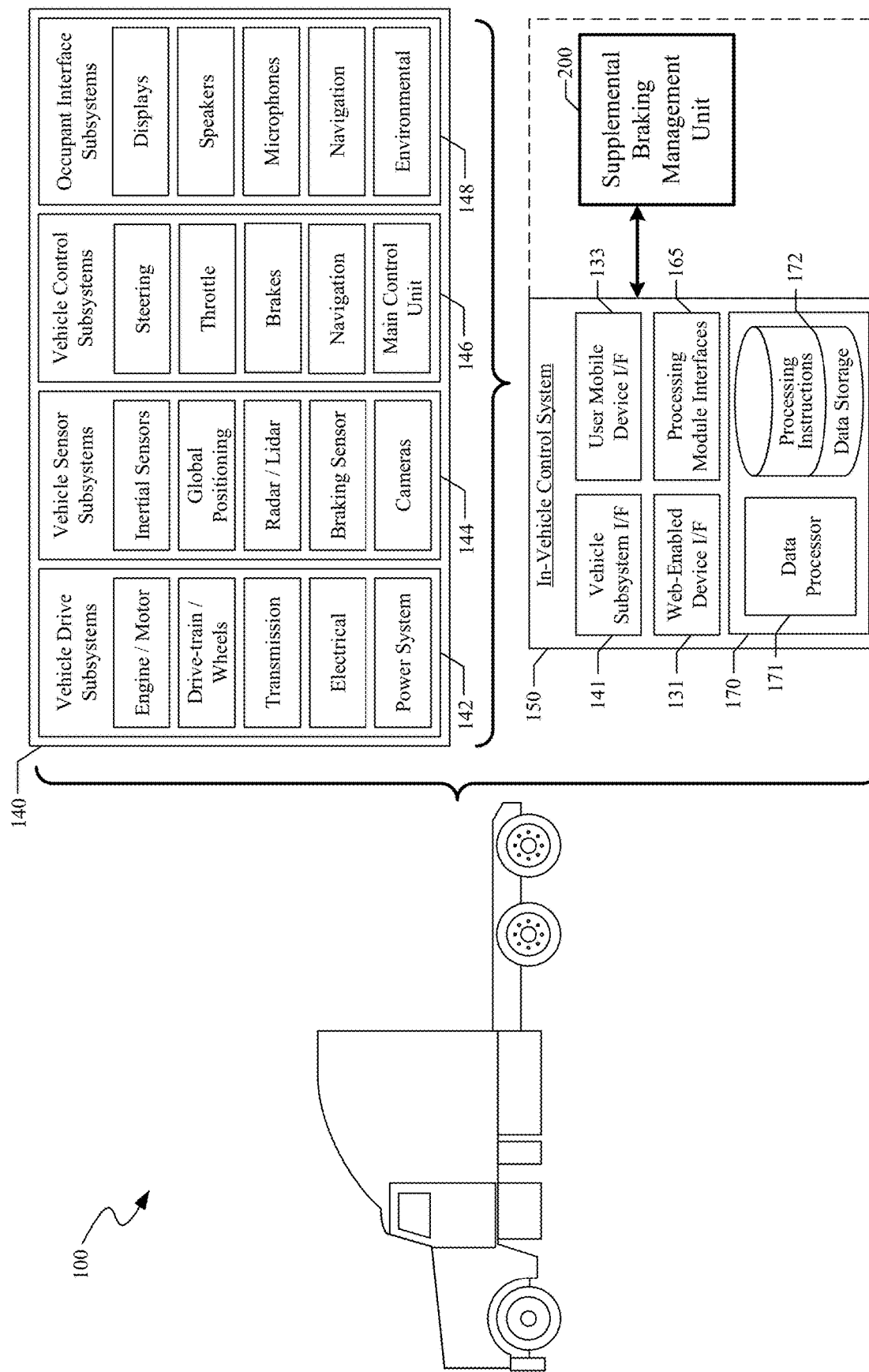
FIG. 1 shows a diagram of an example autonomous vehicle, embodied as a semi-trailer truck (also referred to as a tractor-trailer), equipped with control systems for autonomous functionalities.

Autonomous vehicles can have multiple control systems working integrally and/or independently to control various modules and subsystems of the vehicle, such as the drivetrain, power steering, vehicle sensors (e.g., engine temperature sensor, oil pressure sensor, etc.), environmental sensors to perceive the surroundings (e.g., radar, LIDAR, sonar, inertial measurement units including accelerometers and/or gyroscopes and/or rate sensors, etc.), braking system, and other modules and subsystems. Like driver-controlled vehicles, existing autonomous vehicles typically have a single braking system that controls the braking for all of the wheels of the vehicle.

Nearly all cars and trucks operating today employ an anti-lock braking system (ABS) as the primary braking system of the vehicle. An ABS is an automated system that implements braking based on threshold braking and cadence braking. Most conventional ABS brakes include a central electronic control unit (CECU), wheel speed sensors, and hydraulic valves within a brake hydraulic subsystem. The CECU constantly monitors the rotational speed of each wheel to detect and react to potential wheel lock, e.g., when a wheel rotates relatively slower or faster than the vehicle's speed, by actuating the hydraulic valves to reduce or increase hydraulic pressure to the brake at the detected wheel, respectively, and in turn reduce or increase the braking force on that wheel. The ABS CECU continuously monitors and rapidly actuates this process in order to prevent the vehicle's wheels from locking up during braking. Moreover, existing ABS brakes also provide automated brake-force distribution, traction control system, and/or emergency brake assist.

To improve safety of autonomous vehicles, it would be beneficial to include more than one braking system on the autonomous vehicle. One way to provide multiple, independent braking systems on an autonomous vehicle is to design such braking systems and their controls from scratch, i.e., from the initial design of the overall vehicle. This is both cumbersome and very costly, in particular for large vehicles like semi-trailer trucks. Yet, integration of such multiple, independent braking systems and their controls to the autonomous vehicle's control unit is challenging and problematic because vehicles are designed to only have a single, central braking system that is traditionally controlled by a human driver. One critical challenge is how to design and implement a closed-loop control of an autonomous vehicle's braking system to make the vehicle perform (drive and stop) with stability during autonomous driving. In particular, it is especially challenging to design and implement such a closed-loop braking control system for a semi-truck, since motion control of a semi-truck is far more difficult as compared to vehicles of other types.

Disclosed are devices, systems, and methods for integrating and managing a supplemental brake control system in autonomous vehicles. In some aspects of the disclosed technology, a supplemental brake management system includes brake control hardware and software that operates with a sensing mechanism for determining the brake operational status (of the primary brakes and/or of the supplemental brakes) and a control mechanism for activating the supplemental brake control in an autonomous vehicle, which can be implemented in addition to the vehicle's primary brake control system.

FIG. 1 shows a diagram of an example autonomous vehicle 100, embodied as a semi-trailer truck (also referred to as a tractor-trailer), equipped with control systems for autonomous functionalities, such as a driving system, a steering system, a braking system and a sensor-based perception system installed on the autonomous vehicle 100 in communication with self-driving systems that are controlled by an autonomous vehicle control unit, which are at least partly embodied in computing device(s) installed on the vehicle, and which may be partly embodied in remote computing device(s) in communication with the vehicle-installed computing device(s).

Figure 2:
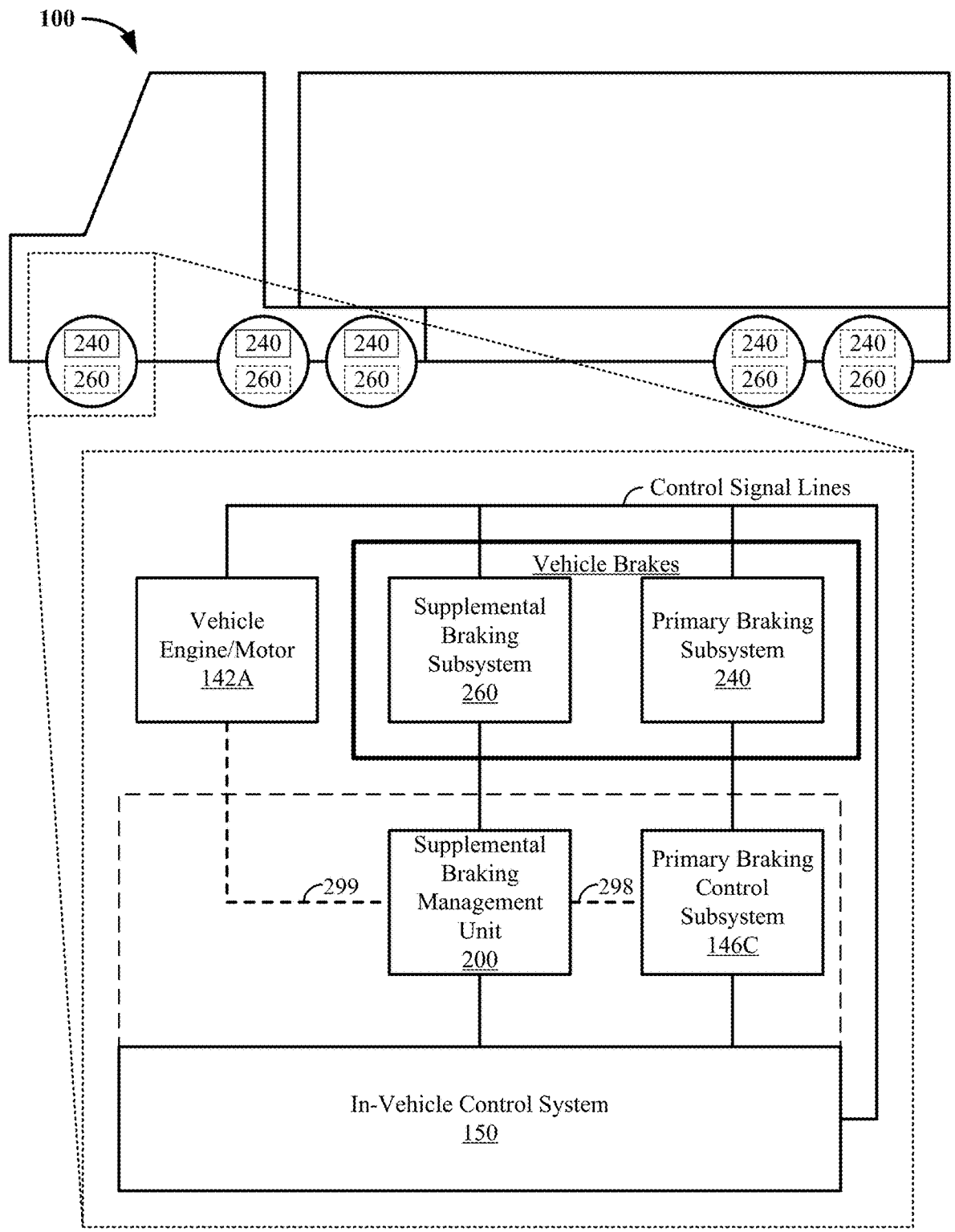
FIG. 2 shows a diagram of an example embodiment of a supplemental braking management unit in accordance with the present technology.

In example embodiments as described herein, the autonomous vehicle 100 includes a braking system 146C for the vehicle that includes (i) a primary braking subsystem, which includes brakes (e.g., ABS brakes) at the wheels of the vehicle (sometimes referred to as "primary brakes", labeled as 240 in FIG. 2), and (ii) a supplemental braking subsystem, which may include additional brake components (e.g., brakes sometimes referred to as "supplemental brakes", labeled as 260 in FIG. 2) at some or all of the wheels of the vehicle and that provides control of the additional brake components. The supplemental brakes can be, for example, ABS brakes. The supplemental braking subsystem is coupled to and controlled independently from the primary brakes.

In an example embodiment, an autonomous vehicle 100 can include an in-vehicle control system 150, also referred to as a vehicle control unit (VCU), which can be in data communication with a plurality of vehicle subsystems 140 resident in the vehicle 100, including the primary braking subsystem and the independent supplemental braking subsystem. The in-vehicle control system 150 can include a vehicle subsystem interface 141 to facilitate data communication between the in-vehicle control system 150 and the plurality of vehicle subsystems 140. The in-vehicle control system 150 can be configured to include a data processor 171 (also referred to as a first processor or a processor of the vehicle control unit) to execute instructions and data for autonomous vehicle control, including processing data received from one or more of the vehicle subsystems 140. The data processor 171 can be combined with a data storage device 172 (e.g., a memory, also referred to as a first memory or a memory of the vehicle control unit; the data storage device 172 can be of any type of a data storage device) as part of a computing system 170 in the in-vehicle control system 150. The data storage device 172 can be used to store data, processing parameters, and data processing instructions.

In various embodiments, the vehicle subsystems 140 includes a primary braking control subsystem, which is in data communication with the in-vehicle control system 150, to control the braking system (e.g., ABS brakes) of the autonomous vehicle 100. As shown in FIG. 1, the in-vehicle control system 150 can also be in data communication with a supplemental braking management unit 200, which is independent of the autonomous vehicle 100's primary braking control module or subsystem.

In various implementations, for example, the data processor 171 is configured to execute instructions and data associated with the supplemental braking management unit 200. As shown by the dashed lines in FIG. 1, the supplemental braking management unit 200 can be integrated into the in-vehicle control system 150 or optionally downloaded to the in-vehicle control system 150 as code that can be executed by the data processor 171 of the in-vehicle control system 150 to implement functionality of the supplemental braking management unit 200. In some embodiments of the in-vehicle control system 150, a processing module interface 165 can be provided to facilitate data communications between the data processor 171 and the supplemental braking management unit 200. In some embodiments, the supplemental braking management unit 200 can include a processor (also referred to as a second processor or a processor of the supplemental braking management unit) and a memory (also referred to as a second memory or a memory of the supplemental braking management unit). FIG. 1 shows the supplemental braking management unit 200 separate from other vehicle control subsystems 146 of the vehicle subsystems 140, for illustration purposes.

The supplemental braking management unit 200 is configured to detect when additional braking is warranted or needed to slow and/or stop the autonomous vehicle 100 to supplement the primary braking subsystem (e.g., in conditions when additional braking power is required) or to substitute the primary braking subsystem (e.g., in conditions when the primary braking power is malfunctioning or fails). In some implementations, for example, the supplemental braking management unit 200 monitors the vehicle's speed and deceleration due to primary braking actuated by the primary braking control subsystem and determines whether to actuate the supplemental braking subsystem (e.g., apply the independent supplemental braking) at some or all of the wheels of the autonomous vehicle 100. In some implementations, for example, the supplemental braking management unit 200 is configured to monitor the primary braking subsystem's control of the braking power distributed to the primary brakes and determine whether to actuate the supplemental braking subsystem at some or all of the wheels of the autonomous vehicle 100. In some implementations, for example, the supplemental braking management unit 200 is configured to monitor one or more control parameters generated at the primary braking control module and to determine whether to actuate the supplemental braking subsystem at some or all of the wheels of the autonomous vehicle 100. Example embodiments of a supplemental braking subsystem, including the supplemental brakes 260 and the supplemental braking management unit 200, are discussed in further detail in connection with FIG. 2.

As illustrated in FIG. 1, the autonomous vehicle 100 may include various vehicle subsystems such as a vehicle drive subsystem 142, a vehicle sensor subsystem 144, and a vehicle control subsystem 146. The autonomous vehicle 100 can optionally include an occupant interface subsystem 148. The autonomous vehicle 100 may include more or fewer subsystems, and each subsystem could include multiple elements. Further, any of the subsystems and elements of the autonomous vehicle 100 can be interconnected. Thus, one or more of the described functions of the autonomous vehicle 100 may be divided up into additional functional or physical components or combined into fewer functional or physical components. In some further examples, additional functional and physical components may be added to the examples illustrated by FIG. 1.

The vehicle drive subsystem 142 may include components operable to provide powered motion for the autonomous vehicle 100. In an example embodiment, the vehicle drive subsystem 142 may include an engine or motor 142A, wheels/tires 142B, a drivetrain 142C including a transmission, electrical subsystem 142D including an alternator, and a power system that includes a power source and energy storage 142E. The engine or motor 142A may be any combination of an internal combustion engine, an electric motor, steam engine, fuel cell engine, propane engine, or other types of engines or motors. In some example embodiments, the engine may be configured to convert a power source into mechanical energy. In some example embodiments, the vehicle drive subsystem 142 may include multiple types of engines or motors. For instance, a gas-electric hybrid car could include a gasoline engine and an electric motor. Other example embodiments having different combinations of various types of motors and/or engines are possible.

The wheels 142B of the autonomous vehicle 100 may be equipped with standard tires. The wheels of the autonomous vehicle 100 may be configured in various formats, including a unicycle, bicycle, tricycle, or a four-wheel format, such as on a car or a truck, for example. Other wheel geometries are possible, such as those including six or more wheels. Any combination of the wheels of autonomous vehicle 100 may be operable to rotate differentially with respect to other wheels. The wheels 142B may represent at least one wheel that is fixedly attached to the transmission and at least one tire coupled to a rim of the wheel that could make contact with the driving surface. The wheels 142B may include a combination of metal and rubber, or a combination of any other materials. The drivetrain 142C may include elements that are operable to transmit mechanical power from the engine to the wheels. For this purpose, the drivetrain 142C can include a transmission with a gearbox, a clutch, a differential, and drive shafts. The drivetrain may include other elements as well. The drive shafts may connect to one or more axles that could be coupled to one or more wheels. In some vehicles, a motor may be connected to each axel or each wheel.

The power system 142E of the vehicle drive subsystem 142 may represent a source of energy that may, in full or in part, power the engine or motor and store energy for the vehicle. The power system 142E also provides energy for other subsystems of the autonomous vehicle 100, typically by an electrical power source. In the embodiment shown in FIG. 1, an electrical power source includes a battery. Other examples of power sources that can power the engine or motor can include gasoline, diesel, other petroleum-based fuels, propane, other compressed gas-based fuels, ethanol, fuel cell, solar panels, batteries, and other sources of electrical power. The power source could additionally or alternatively include any combination of fuel tanks, batteries, capacitors, or flywheels. The electrical system 142D may include elements that are operable to transfer and control electrical signals in the autonomous vehicle 100. These electrical signals can be used to activate lights, servos, electrical motors, and other electrically driven or controlled devices of the autonomous vehicle 100.

The vehicle sensor subsystem 144 may include a number of sensors configured to sense information or perception data related to an environment or condition of the autonomous vehicle 100. For example, the vehicle sensor subsystem 144 may include an inertial measurement unit (IMU) 144A, a Global Positioning System (GPS) transceiver 144B, a RADAR unit 144C, a laser range finder/LIDAR unit 144C, a braking sensor 144D, and one or more cameras or image capture devices 144E. The vehicle sensor subsystem 144 may also include sensors configured to monitor internal systems and/or subsystems of the autonomous vehicle 100 (e.g., an $O_2$ monitor, a fuel gauge, an engine oil temperature). Other sensors are possible as well. One or more of the sensors included in the vehicle sensor subsystem 144 may be configured to be actuated separately or collectively in order to modify a position, an orientation, or both, of the one or more sensors.

The IMU 144A may include any combination of sensors (e.g., accelerometers and gyroscopes) configured to sense position and orientation changes of the autonomous vehicle 100 based on inertial acceleration. The GPS transceiver 144B may be any sensor configured to estimate a geographic location of the autonomous vehicle 100. For this purpose, the GPS transceiver 144A may include a receiver/transmitter operable to provide information regarding the position of the autonomous vehicle 100 with respect to the Earth. The RADAR unit 144C may represent a system that utilizes radio signals to sense objects within the local environment of the autonomous vehicle 100. In some embodiments, in addition to sensing the objects, the RADAR 144C unit may additionally be configured to sense the speed and the heading of the objects proximate to the autonomous vehicle 100. The laser range finder or LIDAR unit 144C may be any sensor configured to sense objects in the environment in which the autonomous vehicle 100 is located using lasers. In an example embodiment, the laser range finder/LIDAR unit 144C may include one or more laser sources, a laser scanner, and one or more detectors, among other components. The laser range finder/LIDAR unit 144C could be configured to operate in a coherent (e.g., using heterodyne detection) or an incoherent detection mode. The cameras 144E may include one or more devices configured to capture a plurality of images of the environment of the autonomous vehicle 100. The cameras 144E may be still image cameras or motion video cameras.

The vehicle control subsystem 146 may be configured to control operation of the autonomous vehicle 100 and its components. Accordingly, the vehicle control subsystem 146 may include various elements such as a steering unit 146A, a throttle 146B, a braking unit 146C (which can include the primary brake control subsystem that controls the primary brakes 240), a navigation unit 146D, and a main autonomous control unit 146E. The steering unit 146A may represent any combination of mechanisms that may be operable to adjust the heading of autonomous vehicle 100. The throttle 146B may be configured to control, for instance, the operating speed of the engine and, in turn, control the speed of the autonomous vehicle 100. In an internal combustion engine, the throttle 146B may control the fuel supplied to a vehicle's engine during combustion. The braking unit 146C can include any combination of mechanisms configured to decelerate the autonomous vehicle 100. The brake unit 146C can use friction to slow the wheels in a standard manner. In other embodiments, the brake unit 146C may convert the kinetic energy of the wheels to electric current. The brake unit 146C may take other forms as well. The navigation unit 146D may be any system configured to determine a driving path or route for the autonomous vehicle 100. The navigation unit 146D may additionally be configured to update the driving path dynamically while the autonomous vehicle 100 is in operation. In some embodiments, the navigation unit 146D may be configured to incorporate data from a GPS transceiver and/or one or more predetermined maps so as to determine the driving path for the autonomous vehicle 100.

The vehicle control subsystem 146 can include a main control unit 146E configured to identify, evaluate, and avoid or otherwise negotiate potential obstacles in the environment of the autonomous vehicle 100. In general, the main control unit 146E may be configured to control the autonomous vehicle 100 for operation without a driver or to provide driver assistance in controlling the autonomous vehicle 100. In some embodiments, the main autonomous control 146E unit may be configured to incorporate data from the GPS transceiver 144B, the RADAR, the LIDAR 144C, the cameras 144E, and/or other vehicle subsystems to determine a driving path or trajectory for the autonomous vehicle 100. The vehicle control subsystem 146 may additionally or alternatively include components other than those shown and described.

The optional occupant interface subsystems 148 may be configured to allow interaction between the autonomous vehicle 100 and external sensors, other vehicles, other computer systems, and/or an occupant or user of the autonomous vehicle 100. For example, the occupant interface subsystems 148 may include standard visual display devices 148A, speakers or other audio output devices 148B, microphones or other audio input devices 148C, navigation interfaces 148D, and interfaces for controlling the internal environment 148E (e.g., temperature, fan, etc.) of the autonomous vehicle 100. The visual display devices 148A may include any of plasma displays, liquid crystal displays (LCDs), touchscreen displays, heads-up displays, or the like.

In some embodiments of the in-vehicle control system 150, a web-enabled device interface 131 can be provided to facilitate data communications between the in-vehicle control system 150 and an external network (not shown) via a web-enabled device of the autonomous vehicle 100 (not shown). The external network can be a network of computers in communication with each other, including the cloud. Similarly, in some embodiments of the in-vehicle control system 150, a user mobile device interface 133 can be provided to facilitate data communication between the in-vehicle control system 150 and the external network via a user mobile device (not shown). In this manner, the in-vehicle control system 150 can obtain real-time access to network resources via the external network, which can be used to obtain, for example, processing modules for execution by data processor 171, data content to train internal neural networks of the in-vehicle control system 150 and/or other systems and/or subsystems of the autonomous vehicle 100, system parameters, or other data.

FIG. 2 shows a diagram of an example embodiment of an autonomous vehicle braking system that includes the supplemental braking management unit 200 in communication with the supplemental braking subsystem (supplemental brakes) 260, and the primary braking control subsystem 146C in communication with the primary braking subsystem (primary brakes) 240. The supplemental braking management unit 200 and the primary braking control subsystem 146C are both in data communication with the in-vehicle control system 150 (e.g., via the processing module interface 165 in FIG. 1). As illustrated by the dashed line 298, in some optional embodiments, the supplemental braking management unit 200 can be configured in communication with the primary braking control subsystem 146C, e.g., for monitoring the control process of the primary brakes 240 in order to regulate actuation of the supplemental brakes 260. As illustrated by the dashed line 299, in some optional embodiments, the supplemental braking management unit 200 can be configured in communication with the engine/motor 142A of the autonomous vehicle 100 (and/or other elements of the vehicle drive subsystem 142), e.g., for monitoring various driving parameters including speed of the vehicle.

The example embodiment of the autonomous vehicle braking system shown in FIG. 2 illustrates the supplemental braking management unit 200 configured on the autonomous vehicle 100 having multiple independent braking systems, in which the supplemental braking management unit 200 is able to regulate the braking of one of the independent braking systems with or without feedback or another type of communication or information from the other(s) of the independent braking systems. In this configuration, the supplemental braking management unit 200 is operable to regulate the braking power distribution to some or all of the wheels independently from the primary braking system that is autonomously controlled to brake in conventional braking practices for autonomous driving. In some embodiments, the supplemental braking subsystem 260 (supplemental brakes) can include certain additional braking components, e.g., secondary air valves, to couple to and augment the function of the braking disk/drum of the primary braking subsystem 240 (primary brakes).

FIG. 3 shows a diagram of an example embodiment of a method for producing a supplemental braking system for an autonomous vehicle, labeled 300. In some implementations of the method 300, the manufactured vehicle includes a semi-trailer truck. The method 300 includes a process 310 for providing a manufactured vehicle operable for autonomous driving. In some implementations, the manufactured vehicle may include a vehicle control unit (VCU), e.g., like the in-vehicle control system 150, which comprises a processor and memory and is configured to provide control signals to (i) main subsystems of a vehicle and (ii) autonomous control modules of the vehicle. For example, the autonomous control modules that control autonomous driving functionalities of the autonomous vehicle can include a steering control module, a throttle control module and a primary braking control module, in which the primary braking control module is configured to control a primary braking system that serves as the standard, main brakes of the manufactured vehicle. For example, the primary braking system can include the main brakes coupled to at least some wheels of the autonomous vehicle.

In some embodiments, for example, the process 310 can include obtaining a fully-manufactured autonomous vehicle from a manufacturer or from another party (e.g., after market). Yet, in some embodiments, for example, the process 310 can include obtaining a pre-manufactured vehicle, in which the pre-manufactured vehicle is partially autonomous. In some embodiments, for example, the process 310 can include obtaining a functional non-autonomous or partially-autonomous vehicle and installing the VCU to make it an autonomous vehicle.

The method 300 includes a process 320 for augmenting the manufactured vehicle with a supplemental braking system that interfaces with a primary braking system, the supplemental braking system comprising brakes (supplemental brakes) coupled to one or more of the wheels of the autonomous vehicle. In some embodiments, for example, the process 320 can include installing and/or adding supplemental braking components of the supplemental braking system to the primary braking system on the one or more wheels of the manufactured vehicle; whereas in some embodiments, the process 320 can include testing of previously-installed supplemental brakes on the one or more wheels.

The method 300 includes a process 330 for configuring a supplemental braking management unit in the manufactured vehicle, wherein the supplemental braking management unit is in communication with the vehicle control unit (VCU) for (i) monitoring braking of the primary baking subsystem and (ii) independently regulating braking of the supplemental braking system. In some embodiments, for example, the process 330 includes installing hardware and/or software of the supplemental braking management unit (e.g., which can include a processor and a memory and/or software code comprising instructions executable by a processor and storable on a memory).

In some implementations of the method 300, for example, the supplemental braking management unit is configured to detect a malfunction or a failure of the primary braking control module and to determine whether to actuate the supplemental braking system to engage the vehicle's brakes. In some implementations of the method 300, for example, the supplemental braking management unit is configured to monitor speed and/or deceleration of the autonomous vehicle due to braking of the brakes actuated by the primary braking control module and to determine whether to actuate the supplemental braking system to engage the vehicle's brakes. In some implementations of the method 300, for example, the supplemental braking management unit is configured to monitor one or more control parameters generated at the primary braking control module and to determine whether to actuate at least some of the vehicle's brakes.

One aspect of the disclosed technology relates to a system for managing braking in an autonomous vehicle, comprising: a vehicle control unit comprising a processor and a memory of the vehicle control unit, wherein the vehicle control unit is configured to provide control signals to (i) subsystems of the autonomous vehicle including a steering subsystem, a throttle subsystem and a primary braking subsystem including primary brakes coupled to at least one wheel of the autonomous vehicle, and (ii) autonomous control modules configured to control autonomous driving functionalities of the autonomous vehicle, wherein the autonomous control modules include a steering control module, a throttle control module and a primary braking control module, and wherein the primary braking control module is in communication with the primary braking subsystem; a supplemental braking subsystem including supplemental brakes at one or more wheels of the autonomous vehicle; and a supplemental braking management unit configured to (i) monitor braking of the primary braking subsystem and (ii) regulate braking of the supplemental braking subsystem.

In some embodiments of the system for managing braking in an autonomous vehicle, the supplemental braking management unit includes a processor and a memory of the supplemental braking management unit. In some example embodiments, the supplemental braking management unit is configured to regulate braking of the supplemental braking subsystem independently from braking of the primary braking subsystem. According to another example embodiment, the memory of the vehicle control unit stores instructions that, when executed by the processor of the vehicle control unit, cause the processor of the vehicle control unit to implement the supplemental braking management unit configured to (i) monitor braking of the primary braking subsystem and (ii) regulate braking of the supplemental braking subsystem.

In some embodiments, the supplemental brakes include anti-lock type brakes. In yet another example embodiment, the supplemental braking management unit is configured to detect when additional braking is needed to slow and/or to stop the autonomous vehicle. In an example embodiment, the supplemental braking management unit is configured to detect a malfunction or a failure of the primary braking control module and to determine whether to actuate at least some of the supplemental brakes. In some example embodiments, the supplemental braking management unit is configured to monitor speed and/or deceleration of the autonomous vehicle due to braking of the brakes actuated by the primary braking control module and to determine whether to actuate the supplemental brakes at some or all of the wheels of the autonomous vehicle. According to an example embodiment, the supplemental braking management unit is configured to monitor one or more control parameters generated by the primary braking control module and to determine whether to actuate the supplemental brakes at some or all of the wheels of the autonomous vehicle. In yet another example embodiment, the supplemental braking management unit is configured to monitor the primary braking subsystem's control of the braking power distributed to the primary brakes and determine whether to actuate at least some of the supplemental brakes.

Another aspect of the disclosed technology relates to a method of managing braking in an autonomous vehicle, comprising: monitoring braking of a primary braking subsystem and regulating braking of a supplemental braking subsystem, wherein the primary braking subsystem includes primary brakes coupled to at least one wheel of the autonomous vehicle, and wherein the supplemental braking subsystem includes supplemental brakes at one or more wheels of the autonomous vehicle.

In some example embodiments of the method of managing braking in an autonomous vehicle, the regulating braking of the supplemental braking subsystem is performed independently from regulating braking of the primary braking subsystem. In an example embodiment, the method of managing braking in an autonomous vehicle further comprises detecting a malfunction or a failure in the primary braking subsystem and determining whether to actuate at least some of the supplemental brakes. In another example embodiment, the method of managing braking in an autonomous vehicle further comprises monitoring speed and/or deceleration of the autonomous vehicle due to braking of the primary brakes and determining whether to actuate at least some of the supplemental brakes. In yet another example embodiment, the method of managing braking in an autonomous vehicle further comprises monitoring one or more control parameters generated in the primary braking subsystem and determining whether to actuate the supplemental brakes at some or all of the wheels of the autonomous vehicle. According to an example embodiment, the method of managing braking in an autonomous vehicle further comprises monitoring the primary braking subsystem's control of the braking power distributed to the primary brakes and determining whether to actuate the supplemental brakes at some or all wheels of the autonomous vehicle.

Yet another aspect of the disclosed technology relates to a method of producing a supplementary braking system for an autonomous vehicle, comprising: providing a manufactured vehicle operable for autonomous driving, the manufactured vehicle including a vehicle control unit comprising a processor and a memory of the vehicle control unit, the vehicle control unit configured to provide control signals to (i) subsystems of the manufactured vehicle including a steering subsystem, a throttle subsystem and a primary braking system including primary brakes coupled to at least one wheel of the manufactured vehicle, and (ii) autonomous control modules configured to control autonomous driving functionalities of the manufactured vehicle, wherein the autonomous control modules include a steering control module, a throttle control module and a primary braking control module, and wherein the primary braking control module is configured to control the primary braking system; augmenting the manufactured vehicle with a supplemental braking system including supplemental brakes at one or more wheels of the manufactured vehicle; and providing a supplemental braking management unit in the manufactured vehicle that is in communication with the vehicle control unit for (i) monitoring braking in the primary braking system and (ii) regulating braking in the supplemental braking system.

In some example embodiments, the method of producing a supplementary braking system for an autonomous vehicle further comprises adding components of the supplemental braking system to the primary brakes on the one or more wheels of the manufactured vehicle. In an example embodiment, the method of producing a supplementary braking system for an autonomous vehicle further comprises installing hardware and/or software of the supplemental braking management unit. According to some example embodiments, the manufactured vehicle includes a semi-trailer truck.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A system for managing braking in an autonomous vehicle, comprising:
   a vehicle control unit comprising a processor and a memory of the vehicle control unit, wherein the vehicle control unit is configured to provide control signals to (i) subsystems of the autonomous vehicle including a steering subsystem, a throttle subsystem and a primary braking subsystem including primary brakes coupled to at least one wheel of the autonomous vehicle, and (ii) autonomous control modules configured to control autonomous driving functionalities of the autonomous vehicle, wherein the autonomous control modules include a steering control module, a throttle control module and a primary braking control module, and wherein the primary braking control module is in communication with the primary braking subsystem;
   a supplemental braking subsystem including supplemental brakes at one or more wheels of the autonomous vehicle; and
   a supplemental braking management unit configured to (i) monitor braking of the primary braking subsystem and (ii) regulate braking of the supplemental braking subsystem, wherein the supplemental braking management unit is configured to monitor speed and deceleration of the autonomous vehicle due to braking of the primary brakes actuated by the primary braking control module and to determine whether to actuate the supplemental brakes at some or all wheels of the autonomous vehicle.

2. The system of claim 1, wherein the supplemental braking management unit includes a processor and a memory of the supplemental braking management unit.

3. The system of claim 1, wherein the supplemental braking management unit is configured to regulate braking of the supplemental braking subsystem independently from braking of the primary braking subsystem.

4. The system of claim 1, wherein the memory of the vehicle control unit stores instructions that, when executed by the processor of the vehicle control unit, cause the processor of the vehicle control unit to implement the supplemental braking management unit configured to (i) monitor braking of the primary braking subsystem and (ii) regulate braking of the supplemental braking subsystem.

5. The system of claim 1, wherein the supplemental brakes include anti-lock type brakes.

6. The system of claim 1, wherein the supplemental braking management unit is configured to detect when additional braking is needed to slow and/or to stop the autonomous vehicle.

7. The system of claim 1, wherein the supplemental braking management unit is configured to detect a malfunction or a failure of the primary braking control module and to determine whether to actuate at least some of the supplemental brakes.

8. The system of claim 1, wherein the supplemental braking management unit is configured to monitor one or more control parameters generated by the primary braking control module and to determine whether to actuate the supplemental brakes at some or all of the wheels of the autonomous vehicle.

9. The system of claim 1, wherein the supplemental braking management unit is configured to monitor the primary braking subsystem's control of braking power distributed to the primary brakes and determine whether to actuate at least some of the supplemental brakes.

10. A method of managing braking in an autonomous vehicle, comprising:
    monitoring braking of a primary braking subsystem and regulating braking of a supplemental braking subsystem,
        wherein the primary braking subsystem includes primary brakes coupled to at least one wheel of the autonomous vehicle, and
        wherein the supplemental braking subsystem includes supplemental brakes at one or more wheels of the autonomous vehicle; and
    monitoring speed and deceleration of the autonomous vehicle due to braking of the primary brakes and determining whether to actuate at least some of the supplemental brakes.

11. The method of claim 10, wherein the regulating braking of the supplemental braking subsystem is performed independently from regulating braking of the primary braking subsystem.

12. The method of claim 10, further comprising detecting a malfunction or a failure in the primary braking subsystem and determining whether to actuate at least some of the supplemental brakes.

13. The method of claim 10, further comprising monitoring one or more control parameters generated in the primary braking subsystem and determining whether to actuate the supplemental brakes at some or all of the wheels of the autonomous vehicle.

14. The method of claim 10, further comprising monitoring the primary braking subsystem's control of braking power distributed to the primary brakes and determining whether to actuate the supplemental brakes at some or all wheels of the autonomous vehicle.

15. A method of producing a supplementary braking system for an autonomous vehicle, comprising:
    providing a manufactured vehicle operable for autonomous driving, the manufactured vehicle including a vehicle control unit comprising a processor and a memory of the vehicle control unit, the vehicle control unit configured to provide control signals to (i) subsystems of the manufactured vehicle including a steering subsystem, a throttle subsystem and a primary braking system including primary brakes coupled to at least one wheel of the manufactured vehicle, and (ii) autonomous control modules configured to control autonomous driving functionalities of the manufactured vehicle, wherein the autonomous control modules include a steering control module, a throttle control module and a primary braking control module, and wherein the primary braking control module is configured to control the primary braking system;

augmenting the manufactured vehicle with a supplemental braking system including supplemental brakes at one or more wheels of the manufactured vehicle; and providing a supplemental braking management unit in the manufactured vehicle that is in communication with the vehicle control unit for (i) monitoring braking in the primary braking system and (ii) regulating braking in the supplemental braking system, wherein the supplemental braking management unit is configured to monitor speed and deceleration of the manufactured vehicle due to braking of the primary brakes actuated by the primary braking control module and to determine whether to actuate the supplemental brakes at some or all wheels of the manufactured vehicle.

16. The method of claim 15, further comprising adding components of the supplemental braking system to the primary brakes on the one or more wheels of the manufactured vehicle.

17. The method of claim 15, further comprising installing hardware and/or software of the supplemental braking management unit.

18. The method of claim 15, wherein the manufactured vehicle includes a semi-trailer truck.

\* \* \* \* \*

UNITED STATES PATENT AND TRADEMARK OFFICE
CERTIFICATE OF CORRECTION

PATENT NO. : 11,724,677 B2
APPLICATION NO. : 17/019161
DATED : August 15, 2023
INVENTOR(S) : Xiaoling Han et al.

It is certified that error appears in the above-identified patent and that said Letters Patent is hereby corrected as shown below:

In the Claims

In Column 16, Line 56, in Claim 13, delete "all of the" and insert -- all --, therefor.

Signed and Sealed this
Third Day of October, 2023

Katherine Kelly Vidal
*Director of the United States Patent and Trademark Office*